United States Patent
Sandstrom

(10) Patent No.: US 7,558,260 B2
(45) Date of Patent: Jul. 7, 2009

(54) BYTE-TIMESLOT-SYNCHRONOUS, DYNAMICALLY SWITCHED MULTI-SOURCE-NODE DATA TRANSPORT BUS SYSTEM

(75) Inventor: Mark Henrik Sandstrom, San Francisco, CA (US)

(73) Assignee: Optimum Communication Services, Inc., Edmonton (CA)

( * ) Notice: Subject to any disclaimer, the term of this patent is extended or adjusted under 35 U.S.C. 154(b) by 1040 days.

(21) Appl. No.: 10/382,729

(22) Filed: Mar. 7, 2003

(65) Prior Publication Data
US 2004/0174891 A1    Sep. 9, 2004

(51) Int. Cl.
*H04L 12/28* (2006.01)
(52) U.S. Cl. ........................ 370/389; 370/509
(58) Field of Classification Search ............. 370/252, 370/389, 471, 509, 907
See application file for complete search history.

(56) References Cited

U.S. PATENT DOCUMENTS

| | | | |
|---|---|---|---|
| 4,587,651 A | | 5/1986 | Nelson et al. |
| 5,315,596 A | * | 5/1994 | Lee ........................ 370/369 |
| 5,461,622 A | * | 10/1995 | Bleickardt et al. .......... 370/907 |
| 5,646,758 A | * | 7/1997 | Miki et al. ................. 370/521 |
| 5,719,858 A | * | 2/1998 | Moore ....................... 370/347 |
| 6,108,306 A | | 8/2000 | Kalkunte et al. |
| 6,157,656 A | | 12/2000 | Lindgren et al. |
| 6,195,332 B1 | | 2/2001 | Tang |
| 6,246,692 B1 | | 6/2001 | Dai et al. |
| 6,411,410 B1 | * | 6/2002 | Wright et al. ................ 398/79 |
| 6,542,511 B1 | | 4/2003 | Livermore et al. |
| 6,556,548 B1 | | 4/2003 | Kirkby et al. |
| 6,631,128 B1 | | 10/2003 | Lemieux |
| 6,667,956 B2 | | 12/2003 | Beshai et al. |
| 6,667,990 B1 | * | 12/2003 | Arao .......................... 370/907 |
| 6,697,373 B1 | | 2/2004 | Sandstrom |
| 6,741,572 B1 | | 5/2004 | Graves et al. |
| 6,782,007 B1 | * | 8/2004 | Redman ...................... 370/509 |
| 6,813,277 B2 | | 11/2004 | Edmon et al. |
| 6,826,160 B1 | | 11/2004 | Wang et al. |
| 6,973,504 B2 | | 12/2005 | Nomura |
| 6,975,649 B1 | * | 12/2005 | Roberts et al. ............... 370/506 |
| 7,042,892 B2 | * | 5/2006 | Young ........................ 370/476 |
| 7,072,361 B1 | * | 7/2006 | Player ........................ 370/472 |
| 7,075,944 B1 | * | 7/2006 | Takagi ........................ 370/470 |
| 7,130,276 B2 | * | 10/2006 | Chen et al. ................... 370/249 |
| 2005/0152349 A1 | * | 7/2005 | Takeuchi et al. ............. 370/373 |
| 2005/0174948 A1 | * | 8/2005 | Isonuma ...................... 370/907 |
| 2006/0182144 A1 | * | 8/2006 | Dove ........................ 370/470 |
| 2007/0053369 A1 | * | 3/2007 | Mizutani ..................... 370/401 |

* cited by examiner

*Primary Examiner*—Ricky Ngo
*Assistant Examiner*—Phuongchau B Nguyen
(74) *Attorney, Agent, or Firm*—Fenwick & West LLP

(57) ABSTRACT

A self-optimizing digital communications network for transporting data among a set of nodes, such as routers, switches or terminal equipment, based on multi-source-node data transport channels, which have a framed carrier signal, and on which frame-slots are dynamically assigned among the individual source nodes of the channel using channel access control signaling in signal frame overhead. Per each such multi-source-node channel, each individual source node is identified with a unique channel access number called Local Node Identifier, and a control information field called Active Node Identifier carried in the overhead of each frame selects one of the channel source nodes to transmit data on the channel on the next frame period. With the present invention, all nodes along such channels access the channel synchronously using the same frame-timeslot phase, so that the channel can have a different active source node even for every new frame period, without any channel down-time.

21 Claims, 4 Drawing Sheets

BYTE-TIMESLOT-SYNCHRONOUS, DYNAMICALLY SWITCHED MULTI-SOURCE-NODE DATA TRANSPORT BUS SYSTEM

CROSS-REFERENCES TO RELATED APPLICATIONS

The subject matter of this application is related to and makes references to the following patent applications:

[1] Co-pending U.S. utility patent application Ser. No. 09/938,014, filing date Aug. 24, 2001, by Mark Henrik Sandstrom, entitled "A System and Method for Maximizing the Traffic Delivery Capacity of Packet Transport Networks via Real-time Traffic Pattern Based Optimization of Transport Capacity Allocation";

[2] Co-pending U.S. utility patent application Ser. No. 10/170,260, filing date Jun. 13, 2002, by Mark Henrik Sandstrom, entitled "Input-controllable Dynamic Cross-connect";

[3] Co-pending U.S. utility patent application Ser. No. 10/192,118, filing date Jul. 11, 2002, by Mark Henrik Sandstrom, entitled "Transparent, Look-up-free Packet Forwarding Method for Optimizing Global Network Throughput Based on Real-time Route Status";

[4] U.S. provisional patent application Ser. No. 60/400,880, filing date Aug. 5, 2002, by Mark Henrik Sandstrom, entitled "Intelligent Transport Network Service Delivery Platform";

[5] Co-pending U.S. utility patent application Ser. No. 10/230,698, filing date Aug. 29, 2002, by Mark Henrik Sandstrom, entitled "Dynamically Channelizable Packet Transport Network";

[6] U.S. provisional patent application, received at USPTO mail center on Feb. 27, 2003, inventor Mark Henrik Sandstrom, entitled "Byte-timeslot-accurate, Dynamically Switched Adaptive-Concatenation Packet-Over SDH/SONET Multiplexer Bus System", which are herein incorporated in their entirety by reference.

This application further claims the benefit under 35 U.S.C. § 119(e) of U.S. provisional application U.S. provisional patent application [6], which is herein incorporated in its entirety by reference.

BACKGROUND OF THE INVENTION

1. Technical Field

The present invention pertains to the field of communications networks, in particular to the field of data transport networks.

2. Description of Related Art

List of Acronyms:

| | |
|---|---|
| ACT | Access Control Tag |
| ANI | Active Node Identifier |
| BCR | Bus Capacity Request |
| BTS | Byte TS |
| EOB | End-Of-Bus |
| LNI | Local Node Identifier |
| QoS | Quality of Service |
| SDH | Synchronous Digital Hierarchy, ITU-T Recommendations G.707 and G.783 |
| SONET | Synchronous Optical Network, a subset of SDH used in North America |
| TDM | Time Division Multiplexing |
| TS | Time-Slot |

In communications networks, circuit-switching is generally used to provide connections of pre-definable and guaranteeable quality of service (QoS) between communicating nodes such as switches or terminal equipment. The QoS of a connection is typically defined with parameters such as data transmission bit rate, latency, bit error rate, and maximum down-time, which are straightforwardly defined for a pre-provisioned circuit-switched connection, as the bandwidth of such circuit is dedicated for it and can not be consumed by any other traffic in the network. However, for multi-point packet traffic with unpredictable traffic load variations, such as Internet traffic, a network based on pre-provisioned circuits that have constant bandwidth and coarse connection bandwidth granularity is inefficient, as the connection capacities do not adapt according to the packet traffic load variations across the network. For packet-based data traffic, an alternative for circuit-switching is packet-switching, which however requires complicated packet processing, network resource reservation and session initiation protocols in order to provide pre-definable QoS.

Conventionally, high-bandwidth traffic flows, e.g. Internet traffic between a set of Point-Of-Presences (POPs) of an Internet Service Provider, is carried in networks over dedicated point-to-point connections. As the load variations of Internet type of packet traffic over time are unpredictable, it could be that at some given time most or even all the traffic from a given one of the said set of POPs, called POP A, is destined toward a single one, called POP B, of said set of POPs. Therefore, in order to not limit the billable traffic throughput of the inter-POP network, conventionally between said POPs A and B is provisioned a semi-permanent connection of constant bandwidth equal to the traffic forwarding capacity of POP B (or that of POP A, if smaller). In alike manner, using conventional non-dynamic connection based networks, similar pre-provisioned connections, each with constant bit rate equal to the traffic forwarding capacity of the destination POP, would be needed in order to not create blocking within the inter-POP network. At the same time, a given POP can forward traffic only up to its fixed maximum aggregate data rate, and therefore the conventional architecture based on pre-provisioned, non-dynamic point-to-point connections is not optimal for unpredictable, bursty data traffic. Installing additional intermediate packet switching nodes within such inter-POP network can help reducing the total network capacity required for the non-dynamic point-to-point links, but such additional intermediate packet switching points will however deteriorate the traffic QoS by increasing delay, delay variation and packet loss rate, and consequently will lower the effective client traffic throughput i.e. the volume of in-time delivered data packets.

Due to the rapid growth in Internet and other data traffic, and due to importance of pre-definable QoS for a reliable, high-quality communications service, there is a need for a network alternative that is based on and interoperable with standard circuit-switched legacy networks, in particular those based on the widely deployed SDH/SONET protocols, but that provides means for dynamically adapting the bandwidth of the circuit-switched connections across the network based on real-time packet traffic load patterns, in order to optimize the data traffic throughput of a network of given physical capacity.

BRIEF SUMMARY OF THE INVENTION

The present invention provides a self-optimizing communications network system for forwarding and transporting data packets among network nodes such as routers, switches and terminal equipment. The network utilizing the present invention optimizes its capacity allocation pattern according to the real-time data traffic load patterns among the nodes across the network. More specifically, the present invention provides a network system that is based on multi-source-node data transport channels, on which the active source node is selected dynamically for every new channel signal frame period, based on the traffic load variations among the channel source nodes so as to continuously optimize the network capacity allocation pattern according to the real-time traffic load patterns presented to the network. The present invention thus offers a more efficient data transport network alternative compared to the conventional networks, which are based on non-dynamic point-to-point connections.

The novel real-time self-optimizing capability of the network system of present invention is based on a multi-source-node digital communications channel that uses a regular, e.g., SDH/SONET-like, framed carrier signal, and on which specific channel-access-control signaling bit-fields within the overhead timeslots of signal frames identify which individual source node of the channel is to transmit data on the channel on the following frame period on the channel. Such dynamic frame-slot switching method enables dynamic allocation of network data transport capacity. That method is particularly efficient when a number of such multi-source-node channels are grouped together to form a multi-channel data transport bus, on which the allocation of member channels among the set of bus source nodes is optimized for every new bus frame period. In a preferred embodiment, the bus capacity allocation, implemented via the channel-access-control signaling, is computed for the bus by a bus access controller based on traffic load i.e. bus capacity request information gathered from the individual channel source nodes, which information also is transferred via frame overhead signaling on the channel.

For instance, in case the bus signal frame period is a 125 ms SDH frame period, the present invention provides means for optimizing SDH/SONET network capacity allocation pattern 8000 times per second, whereas conventionally wide-area-network, e.g. SDH/SONET, connection provisioning or modification requires human-involved network management operations, and therefore can not be done dynamically i.e. based real-time traffic load variations, as is done automatically with the present invention.

Since in a preferred embodiment the bus-access-control as well as bus capacity request signaling, which enable the traffic-load-adaptive bus capacity allocation at a single frame-slot granularity, are carried via existing signal frame overhead timeslots, such as path overhead for SDH VC-n or SONET STS-1 based carrier signals, the present invention enables dynamic optimization of network capacity allocation without adding extra overhead. Furthermore, as with the present invention the individual source nodes of the bus access the channel timeslot-synchronously in the common frame-phase of the carrier signal, no network transport capacity is rendered unusable in conjunction of a change of the active source node on the channel. Therefore, the present invention provides means for maximization of the effective network data throughput.

DETAILED DESCRIPTION OF THE INVENTION

Figure 1:
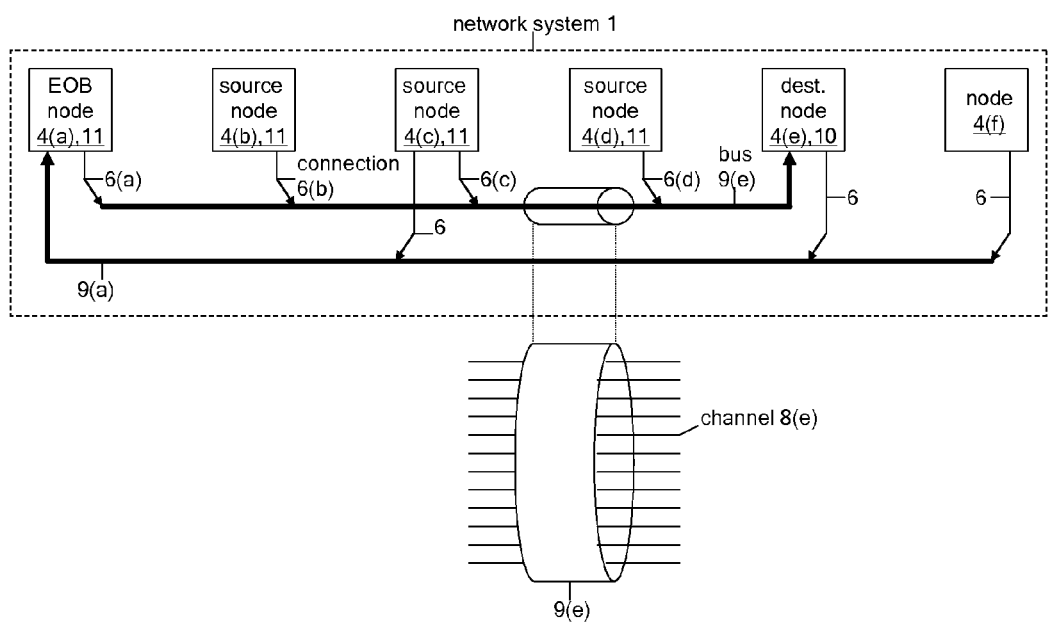
FIG. 1 presents a multi-source-node digital communications channel, the topic of present invention, within a data transport network.

The invention is described herein via illustrating the novel concepts of the present invention and the operation of a preferred embodiment thereof via a detailed description of the drawings. That is followed by a discussion on the relationship of the current patent application with the referenced related patent applications [1] through [6].

Symbols and notations used in the drawings:

In FIG. 1 boxes represent network elements, such as routers or switches, generally referred to as nodes.

Lines and arrows between nodes in the drawings represent a logical communication path, and may consist of one or more physical wires.

Solid arrows indicate a communications signal i.e. data traffic flow.

Bold lines indicate bussed communication paths, i.e. communication paths shareable by traffic flows from either various sources or to various destinations within the reach of the bus.

Lines or arrows crossing in the drawings are decoupled unless otherwise marked. Arrows ending into or beginning from a bus (a bold line) represent joining or disjoining of a sub-flow of data or control traffic into or from the bus, respectively.

Figure 2:
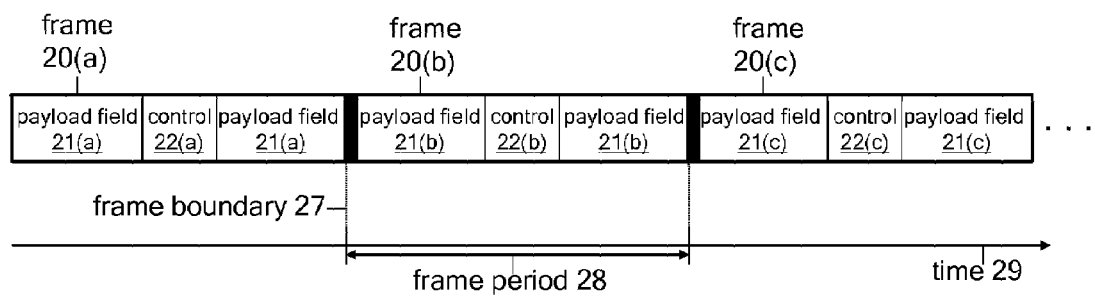
FIG. 2 presents a signal framing structure on the channel of FIG. 1.
Figure 3:
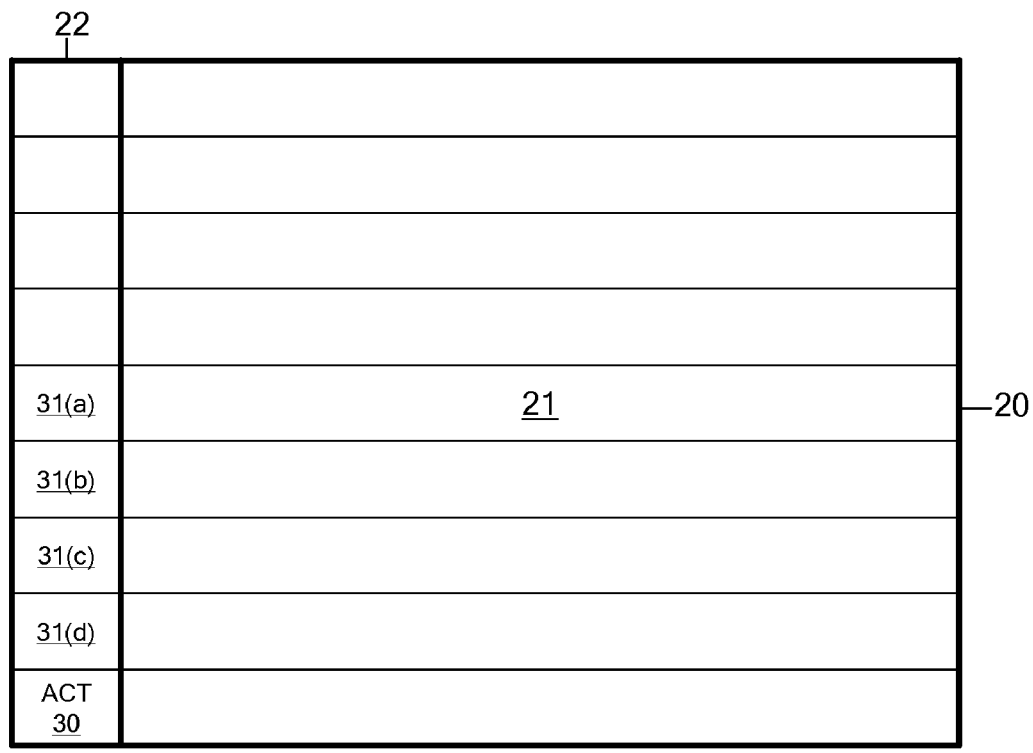
FIG. 3 depicts a more detailed frame structure for a preferred embodiment of the generic signal framing of FIG. 2.
Figure 4:
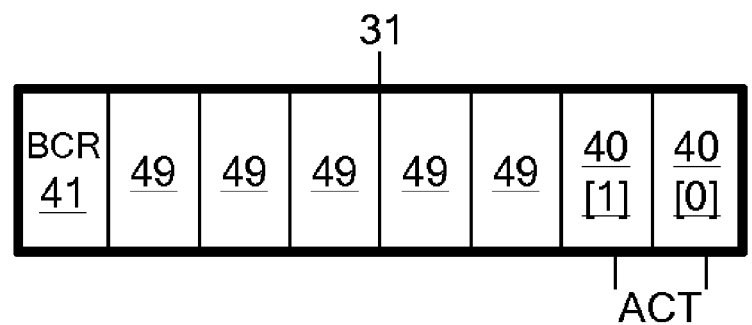
FIG. 4 present in more detail a subfield of the frame structure shown in FIG. 3.

In FIGS. 2, 3 and 4 the boxes, such as 20 or 41, indicate information fields within a signal frame.

The dotted lines between the elements in the drawings indicate that a drawn element is presented below with new aspects shown.

FIG. 1 presents a multi-source-node digital communications bus 9, formed of its member channels 8, in a communications network system 1, which forwards and transports data traffic among nodes 4. In this specification, data traffic or data refers to any form of digital data of any upper-layer protocol and of any contents, including but not limited to digital video, digital voice and regular file transfer. In FIG. 1, the bus and channel instances under study, bus 9(e) and channel 8(e), are able to transport data from the bus source nodes 11 to the bus destination node 10, which are the same as the source and destination nodes, respectively, of the member channels 8 of the bus 9.

A channel 8 has a framed digital carrier i.e. server signal, such as an SDH VC-3 aligned to an STM-N via an AU-3, and a source node 11 of the channel 8 is able to transmit data on the channel on a signal frame, i.e., the source node is able to map data on the payload of the signal frame. Though the bus envelope 9 in FIG. 1 is drawn to be formed of twelve member channels 8, it shall be understood that a bus 9 can comprise any number, including one, of member channels, and in a preferred embodiment each of the bus member channels 8 operate in alike manner described below with reference to FIGS. 2, 3 and 4. In a preferred embodiment, the individual member channels 8 of the bus 9 are time-slot-interleaved within their bus envelope 9, in which case the bus 9 is said to use time-division-multiplexing (TDM) and its member channel 8 occupy their respective timeslots (TSs) within the TDM bus 9. In case of SDH VC-n based channels and AU-n-Xc/STM-N carrier signal, the VC-n based channels 8 are naturally the X TSs interleaved in the VC-n-Xc carrier envelope 9, where parameter n denotes a SDH path signal level such as 11, 12, 2, 3 or 4 or concatenation thereof, N any valid SDH physical signal level such as 0, 1, 4, 16, 64, 256 etc., and integer X the number of member VC-n TSs i.e. channels 8 in the VC-n-Xc concatenation group 9. In this patent application, SDH STM-N i.e. STM-0/1/4/16/64/256 etc. signals are used to denote also SONET STS-1/3/12/48/192/768 etc. signals, respectively.

FIG. 2 presents a sequence of signal frames 20 on the channel 8 of FIG. 1, shown as set on a time axis 29, so that the signal data on the left end of the frame sequence is transmitted and received as the earliest in time. The signal frames in this context refer to any repeating i.e. periodic blocks 20 of data fields, separated by frame boundaries 27, on the channel signal. E.g., in case the channel uses SDH framing with client data carried on VC-3 payloads, such a periodic data block 20, referred to generally as a frame 20 in this patent application, can be:

a VC-3 row, which is repeated nine times per each VC-3 frame;

a specified number of consecutive VC-3 rows, e.g., a block of three VC-3 rows, which block would be repeated three per each VC-3 frame;

one full VC-3 frame, which follow each other contiguously at the higher order path (S3) data layer on an SDH STM-N server signal; or a specified number of consecutive VC-3 frames on the STM-0 timeslot of the VC-3 channel within an SDH STM-N signal, e.g., a block of eight VC-3 frames would repeat itself nominally 1000 times per second on an STM-N server signal.

While above is provided a few specific examples of what is meant with a signal frame or data block herein, it is obvious that a multitude of other embodiments, e.g. SONET Virtual Tributaries, for a signal frame discussed in this application do exist and are likely to emerge in the future. Thus, although, for the sake of clarity, a VC-3 frame is consistently used in this specification as the preferred embodiment of the generic signal frames 20 of FIG. 2, the discussion related to signal frames applies to any sort of repeating block or field of data within a digital signal.

The signal frames 20 of FIG. 2 have the following general characteristic:

Each frame 20 occupies a period of time referred to as frame period 28, which has a constant nominal duration defined in applicable signal protocol specification, and which are separated from each other by frame boundaries 27, a representative of which is marked in FIG. 2 between frames 20(a) and 20(b). A representative of a frame period 28 is marked in FIG. 2 on the time axis 29 for the signal frame period occupied by frame 20(b).

The frames 20 have a control information field 22, referred to as frame overhead or header, associated with them.

The frames 20 include a payload information field 21.

Typically the frame overhead 22 is carried in the channel signal within the same time block 28 as is the payload 21 of the frame 20, which time block is referred to as signal frame-slot or frame period 28. Note however that the frame control information 22 can be located anywhere in time within the frame period 28, and does not need to be one continuous field as it is shown, for clarity, within the frames 20 in FIG. 2. In a preferred embodiment, in case of channels 8 using SDH VC-n structured framing 20, the frame overhead 22 used for the channel control signaling described herein is the VC-n path overhead (POH), the frame payload field 21 is the C-n payload of the VC-n structured channel frames 20, and the frame period 28 duration is nominally 125 ms.

A frame-slot 28, when used for data transfer on a channel 8 from a source node 11 to the destination node 10 of the channel, constitutes a single data transfer slot on the bus 9 assigned to said source node 11. Naturally, a single frame period 28 on a multi-channel-bus 9 of X (an integer) member channel provides a total X data transfer slots to be allocated, in any division, among the individual source nodes 11 of the bus 9.

In the present invention, the frame control information fields 22 carry a piece of information, referred to as channel Access Control Tags (ACTs), which are used to identify one of the source nodes 11 of the channel 8(e) to transmit data on the channel 8(e) on a frame period 28 associated with each ACT. The frame period 28 associated with an ACT carried within the channel signal has to be specified in the applicable channel signal protocol specification, but a general rule is that the ACT must fully precede in time the payload field 21 it is associated with. A minimized control information processing latency and maximized channel efficiency is achieved when the ACT selects one of the channel 8 source nodes 11 to map data on the next full payload field 21 that any channel source node 11 is able to fully fill with its transmitted data. Therefore, with a preferred embodiment of the present invention, the ACT carried within the control information field 22 of a frame 20 is associated with i.e. identifies the active source node 11 for the next frame period 28 on the channel signal. I.e., with a preferred embodiment, in FIG. 2 the control information field 22(a) of frame 20(a) selects the active source node for mapping data on the payload field 21(b) of its successive frame 20(b); the same way, 22(b) controls the transmission on 21(c), and so forth. Obviously, in a corner case where the ACTs are located in the beginning of the frame periods 28, then the most efficient channel access control process can be achieved when the ACT controls the payload 21 of its own frame 20; however such corner case can be equally well presented, by defining that the frame boundary 27 location suitably, so that the ACT is at the end of the frame period 20, and thus also the presented corner case falls within the definition that channel access control process efficiency is maximized when the ACT controls, i.e. is associated with, a payload field 21 in the next channel signal frame 20.

FIG. 3 depicts a more detailed frame structure for a preferred embodiment of the generic signal frames 20 of FIG. 2, such that uses the SDH VC-3 frame structure of nine rows by 90 columns. In this preferred embodiment of frame 20, the frame control information field is carried in the first VC-3 column i.e. in the VC-3 POH column 22, and the frame payload field in the rest of the VC-3 columns i.e. in the C-3 payload 21 of a VC-3 frame. The payload field 21 can be mapped by a channel source node 11 with any type of client data of any protocol, and the first four rows of the POH 22 can be used as per SDH standards. As shown in FIG. 2, in this preferred embodiment the last five rows of POH 22 are used for carrying channel 8 associated control information 31, 30.

The subfield 30 of the frame control information field 22 in FIG. 2 carries the ACT from the furthermost source node of the channel for all the source nodes 11 of the VC-3 channel 8.

In the bus 9(e) application scenario of FIG. 1, a current preferred embodiment the ACT 30 identifies which one of the set of source nodes 11 for each channel 8(e), i.e. of nodes 4(a), 4(b), 4(c) and 4(d), is map data on the payload field 21 of the next VC-3 frame on that channel 8(e).

The subfields 31 of the frame control information field 22 in FIG. 2 are for the individual channel source nodes 11 to insert control information they need to signal for other nodes 4 in the network system. In case of channel 8(e) in FIG. 1, field 31(a) is for the source node 4(a) to insert, field 31(b) for node 4(b), 31(c) for 4(c), and 31(d) similarly for 4(d). In a current preferred embodiment the internal structure of field 31 is depicted in FIG. 4, from where it is seen that field 31, a VC-3 POH byte in the preferred embodiment, further divides in to bit fields 40, 41 and 49. While discussed in detail below in reference to FIG. 4, it is noted herein that bit field 40 is used to identify a source node 11 of a channel 8 i.e. to carry an ACT, and that the same bit format for ACT is used in both subfields 30 and 31.

Said ACT format in a preferred embodiment is such that it identifies the active source node, i.e. the node that is to transmit on the channel on the frame period 28 associated with the ACT, by expressing the number of source nodes 11 between the active node and the destination node, excluding both the active node and the destination node. That aforesaid value carried by ACT is referred to hereafter as the Active Node Identifier (ANI) for the signal frame 20 associated with the ACT 30. Similarly, for a given channel 8, all the source nodes 11 along it are given their respective Local Node Identifiers (LNIs) similarly expressing the number of intermediate channel source nodes 11 in between of each individual source node 11 and the destination node 10 of the channel. Thus, the source nodes 11 of the channel 8(e) in FIG. 1 would have their respective LNIs as follows:

| Source node: | LNI = ACT value that activates the node: |
|---|---|
| 4(a) | 3 |
| 4(b) | 2 |
| 4(c) | 1 |
| 4(d) | 0 |

Hence, an ACT of value 2 in a frame 20 on channel 8(e) would identify the source node 4(b) to transmit data on the channel on the next frame period, and similarly for the rest of the source node—LNI/active ACT value pairs shown in the above table. Generally, the basic channel access control process of present invention involves:

1.) monitoring, by the individual source nodes of a channel 8, the ACT 30 field within each signal frame 20 on the channel, and, 2.) transmitting data on the channel 8, on the frame period 28 associated with the ACT, by that individual channel source node 11 whose LNI matched the ANI carried by said ACT.

SDH/SONET-based preferred embodiment for signal framing 20, such as VC-3, readily provides a standard-based way to extend the herein discussed dynamic, frame-slot switched channel functionality into a multi-channel-bus via regular TDM byte-timeslot interleaving. Thereby it is convenient to arrange a set of VC-3 channels in parallel to form a dynamic, frame-slot switched data transport bus 9 for transfer of data from the bus source nodes 11 to its destination node 10. Such multi-channel bus 9 provides, besides a greater aggregate capacity than a single channel 8, also means for a more granular transfer capacity allocation among the source nodes 11 as it enables more than one, and even all, of the set of its source nodes 11 to transmit data to its destination node 10 simultaneously i.e. during the same frame period 28, by way of assigning the individual member channels of the bus to more than one of the source nodes on a single frame period. For instance, incase there were twelve VC-3 channels 8(e), numbered #0 through #11, on the bus 9(e), on some given frame period 28 on the bus, the source node 4(a) could use the VC-3 channels #0, 1, 2 and 3, while node 4(b) could use channels #4, 5 and 6, 4(c) could use #7, and 4(d) the rest i.e. #8, 9, 10 and 11. On the next frame period the allocation of the channels among the source nodes 4(a) through 4(d) of that twelve-VC-3 bus 9(e) could be totally different, as defined by the ACTs 30 carried in the individual VC-3 channels 8 on the preceding VC-3 frames 20. Whatever the division of the member channels of bus among its source nodes on any given frame period 28, in a preferred embodiment the set of bus channels assigned to an individual source node, such as node 4(c) of bus 9(e) in FIG. 1, are concatenated to continuously form a single, logically un-channelized, connection 6 (6(c) from node 4(c)) from said source node to the destination node of the bus 9.

An efficient implementation, from the perspective of channel bandwidth utilization, of the above described dynamic, frame-slot switched channel requires that each source node 11 of a channel 8 transmits data on its channel using the same frame-period-phase, so that the destination node receives on the channel a continuous sequence of valid, client-data-carrying frames 20 each of uniform nominal duration 28 specified in the channel signal protocol. For the end-of-bus source (EOB) node, e.g. node 4(a) on the channel 8(e) in FIG. 1, this requirement is met simply so that the EOB node transmits a continuous sequence of signal frames, with only those frames 20 mapped with client data that were identified as assigned to said EOB node by their associated ACTs, as per the applicable signal protocol on the channel. The other source nodes 11, referred to as downstream source nodes, on the channel need to continuously keep track of the current frame phase on the channel using a frame timeslot (TS) counter that is once per frame period synchronized to the current frame phase on the channel signal as received from upstream channel i.e. on the channel from the direction of its EOB node. With such upstream-channel frame-phase synchronized frame TS counter, an downstream node along the channel 8 is able to locate and capture the channel-specific ACTs 30 on each frame 20, as well to insert its own control information in its related subfield 31 on each frame on the downstream channel, and, incase the ACT matched with the LNI of said source node, map the frame payload 21 associated with said ACT with client data to be transported to the destination node 10 of the channel 8. In case of a VC-3 channel, the above described upstream-channel frame-phase synchronized channel access process involves performing the SDH standard functions related to accessing a S3 data layer i.e. VC-3 channel carried within an STM-N carrier signal, including STM-N frame boundary detection and AU-n pointer processing to locate the VC-3 frame boundaries 27 and VC-3 POH 22 and C-3 payload 21 byte timeslots (BTSs).

Furthermore, an efficient implementation, both from the perspective of equipment cost and channel bandwidth utilization, for a multi-channel bus 9 formed of the above described frame-BTS synchronously accessed, parallel multi-source-node channels 8, requires that all member channels of the bus have the same common frame phase when received by any of the downstream source nodes 11 or the bus destination node 10, so that the frame periods 28, and thus frame boundaries 27, coincide throughout all channels 8 of the bus 9. In a currently preferred embodiment, this requirement is guaranteed to be met via arranging all the member VC-3 channels 8 of the bus 9 to member VC-3 timeslots of a single VC-3-Xc concatenation group, which is aligned to its carrier STM-N signal via a single AU-3-Xc pointer, thus ensuring that all member VC-3s of the VC-3-Xc bus continuously are in one and the same frame-BTS phase, based on that the frame-BTS phase of a VC-3 is defined by only the frame phase of its carrier STM-N signal and the offset of the AU pointer with which the VC-3 is aligned to its STM-N. Hence, in a currently preferred embodiment, the channels 8 are VC-3 TSs within a single VC-3-Xc bus 9 transmitted by the EOB node of the bus comprising X (any integer, including one) VC-3 TSs in total. Note, that since the downstream nodes of such VC-3-Xc bus insert data only on their assigned VC-3 TSs on that bus and pass-through the other TSs, the AU-3-Xc including its pointer bytes, which are regenerated at each node according to standard SDH pointer processing, flow through all the way to the destination node of the bus, so that the destination node continuously, unless in case of a equipment or fiber damage, will receive a regular SDH VC-3-Xc signal on the bus with a continuous AU-3-Xc pointer from frame to frame, regardless of which source node mapped data on which VC-3 TS 8 of the VC-3-Xc bus 9.

Since the frames 20 on their channels 8 of the bus 9 identify, based on their channel specific ACTs carried via subfields 30, to which source node specific connection 6 each frame 20 belongs to on any given frame period 28 on the bus 9, each source node connection associated receiver instance at the bus destination node 10 knows which VC-3 TSs on the VC-3-Xc bus 9 belongs to its associated connection 6 on each frame period on the bus 9. Such a source node connection associated receiver instance provides a SDH-to-packet demapper function in case of packet-based client traffic carried on its associated connection 6.

Based on the channel control signaling principle described above with reference to FIG. 3, a number of various modifications regarding the location and encoding of the control information fields will be possible to one familiar with the topic based on the teachings in this patent application. For instance, by modifying the frame overheard 22 TS assignment so that the POH byte on each of the nine VC-3 rows of a VC-3 frame 20 carries an ACT field 30 (encoded e.g. such as the bit field 40 of FIG. 4), it is possible to identify a new active source node, one that is potentially different than previous source node, for every new VC-3 row, i.e. thus making it possible to reallocate the VC-3 TSs 8 of a VC-3-Xc bus 9 structure nine times each VC-3 frame period, i.e., to perform optimization of bus capacity allocation at frequency of 9/0.125 ms=72,000 times per second, using the principles of the present invention. However, such modifications are considered to be obvious and thus within the scope of the of the present invention.

FIG. 4 presents the internal bit fields of the subfield 31 of the channel signal frame 20 shown in FIG. 3 in a currently preferred embodiment. The use of these bit fields in a preferred embodiment, which uses VC-3 based channel 8 signal framing 20, are described in the following. Note that bit fields marked with 49 in byte 31 are not required for the herein discussed use of the present invention.

Bit field 40, consisting in this specific embodiment of bits 40[1] and 40[0], is used for carrying an ACT, which was described above in reference to FIG. 3, for a channel 8 on which the node 4 inserting the ACT is the destination node 10. As an example, in the network of FIG. 1, the destination node 4(e) of a channel 8(e), inserts the ACT for said channel 8(e) on the bit-field 41 of the overhead field 31 on another channel 8 on the bus 9(a), which delivers said ACT to the EOB node 4(a) of the bus channel 8(e). The EOB node 4(a) of the channel 8(e), for which the ACT selects the active source node for its associated frame period, then sends the ACT via field 30 within a signal frame 20 on that channel. Naturally, the two-bit-wide field 40 shown in FIG. 4 provides with enough unique ANI values for only up to four source nodes 11 per a channel, and thus a wider bit-field 40 is needed to support more than four source nodes per channel. Such an obvious extension of the presented principle is however very straightforwardly done by providing enough bits for the field 40 to support addressing each channel source node with a unique ANI/LNI value.

Bit field 41 is used to carry capacity request information by the source node inserting it for the channel or bus on which the frame 20 carrying it travels on. In a preferred embodiment of a VC-3-Xc bus 9 formed of X (an integer) VC-3 TS-channels 8, a bus source node 11 sets the bit 41 in its associated field 31 on exactly as many of the X VC-3 TS-channels on the bus as is its current Bus Capacity Request (BCR) in units of VC-3 TSs for its connection 6 to the bus destination node 10. A bus source node 11 creates the magnitude of its BCR figure, i.e. its requested number of channel units on the bus, based on its current amount of data queued on a buffer for a future delivery on the bus 9 toward its destination node 10. For instance, assuming the source node 4(b) of the bus 9(e) in FIG. 1 had, at the time when it inserted its associated field 31(b) on the signal frames 20 on the channels 8(e) of the bus 9(e), such an amount of data load toward the node 4(e) that would require for its connection 6(b) on the bus 9(e) five VC-3s worth of capacity, it would set the bit 41 on the VC-3 channels #0, 1, 2, 3 and 4 to active value '1', and leave the bit 41 to inactive '0' on the rest of the VC-3 channels #5-#11 on the VC-3-12c bus 9(e). In a possible implementation, a source node 11 could determine its BCR figure for a bus 9 by dividing and rounding up its amount of data bytes queued for a future delivery on its associated connection 6 on said bus 9 by the capacity of channel frame payload 21 in bytes.

A Bus Access Controller (BAC), located at the destination node 10 of the bus 9 in a preferred embodiment, will periodically, for each new frame period 28 on its bus 9, perform a bus channel 8 allocation among its source nodes 11, based on the most recent set of BCRs it has received on the bus 9 from its source nodes 11 over source node associated subfields 31, so as to continuously to maximize the rate of client data delivered by the bus 9. This allocation and assignment of bus channels 8 among its source nodes 11 produces a set of bus channel 8 specific ACTs, each of which carries an ANIs identifying one of the bus source nodes 11 to map data on a new frame period 28 on its associated bus channel 8. In the network of FIG. 1, the BAC at the destination node 10(e) of the channel 9(e) will send said set of ACTs, potentially via its associated subfields 41 over the bus 9(a), on which that host node 4(e) of said BAC is a source node 11, to the bus 9(a) destination node 4(a), which will then loop said set of ACTs via subfields 30 back on the bus 9(e), whose EOB node the node 4(a) is. All source nodes 4(a) through 4(d) process and apply said set of ACTs on the bus 9(e) as described earlier, i.e., transmit data on the payloads 21 associated with such ACTs that carried an ANI that matched with their respective LNIs.

DESCRIPTION OF PREFERRED EMBODIMENT

The subject matter of the present invention is a communications network system 1 using buses 9, formed of one or more dynamic frame-slot-switched, multi-source-node digital communications channels 8 shown in FIG. 1, for transporting data among a set network nodes 4.

A key principle of the present invention is a byte-timeslot-synchronous, non-overhead-adding and data-loss-free, data transport channel 8 using a novel channel-access-control signaling mechanism enabling dynamic frame switching. Using the invention multiple, potentially geographically distant and independently clocked source nodes 11 can map data on the same communication channel so that a different source node can map data on said channel on every new frame-slot 28 on the channel. With the invention, switching between the old and new active source nodes on the bus takes place exactly on the frame boundary 27 on the channel.

In a preferred embodiment the invention, i.e. the dynamic frame-slot-switched multi-source-node channel, operates so that furthermost source node on the channel, called the end-of-bus (EOB) source, continuously sends frames, which it may or may not have mapped with data, on the bus with a pointer identifying the byte-timeslot location of the first byte of each frame 20 sent. The EOB source furthermore determines based on the overhead bytes 22 of each frame to which one, potentially itself, of the source nodes of the channel the next frame-slot on the channel is assigned to. A source node of the channel maps its data on the channel on exactly those frame-slots on which it determined that were assigned to it based on the value of an active source node identifier carried in the previous frame overhead. The frame-slot herein can be any repeating block 20 of data on the channel signal that encompasses payload 21 and overhead 22 timeslot(s). For instance, a C-3 row or C-3 frame fill that definition in case of a VC-3 based channel 8.

The invention enables traffic-load-adaptive optimization of communications network capacity allocation, and thereby effectively maximizing data throughput of a communications networks based on real-time packet traffic load variations across the network, such as network 1 of FIG. 1. While the architecture and operation of data transport layer, called data plane, implemented with buses 9, is described in detail in the foregoing in reference to FIGS. 1 through 4, the operation of the control plane of the network system 1, implemented in a preferred embodiment with a logic or software module called Bus Access Controller (BAC) located at the destination node 10 of each bus 9, performing the dynamic channel 8 allocation computation algorithms for buses 9, is described below.

In the currently preferred embodiment, on every frame period 28, the BAC adds together the active-valued Bus Capacity Request (BCR) bits 41 in the source node associated frame 20 control information fields 31 on each channel 8 of the bus 9 to compute the BCR figure, an integer number requested channels, for each individual bus source node. BAC then allocates and assigns the bus channels 8 among the set of bus source nodes 11 once every bus frame period 28 based on the most resent BCRs by its bus source nodes according to the below algorithm:

1.) BAC allocates the member channels of the bus among the individual source node specific connections 6 so that it assigns channels, one channel at a time, per each source whose BCR figure exceeds the number of channels so far assigned to it, until either all channels 8 of the bus are allocated, or until the BCR of each source node is fulfilled, whichever comes first.
2.) Following 1.), the BAC assigns any remaining unallocated channels in an even, round-robin, fashion among all source nodes of the bus.

The above algorithm produces a channel number indexed table containing a set of Active-Node-Identifiers (ANI) identifying the active source node per each bus channel 8 for a new frame period 28 on the bus 9.

The invention of this patent applications is related to the disclosures of the referenced patent applications [1]-[6], which provide detailed engineering specifications for a practical system implementation, as well as more background and application description for the present invention. The relationship between each referenced patent application and the current patent application is summarized below.

The referenced patent applications [1] and [5] provide specifications for generic system for packet traffic load adaptive allocation of transport network capacity. That system is herein amended with specifications for byte-timeslot-synchronized frame-slot-switched multi-source-node channels 8. Particular merits of the specifications in the current application are that the current method enables changing network capacity allocation even as frequently as every other network byte-timeslot (BTS), and up to as frequently as every VC-3/4 row period i.e. 9×8×1000=72000 times per second without losing any network client-data transport capacity for signaling overhead, as the channel control signaling 30, 31 could in the case of VC-3/4 row-rate switching still be carried in the VC-3/4 POH timeslots. The extreme case of changing network capacity at every other network BTS would be achieved when frames 20 in FIG. 2 would consist of just one control byte 22 and one payload byte 21.

The referenced patent application [2] provides a dynamic cross-connect mechanism used in a preferred implementation of a network system 1 utilizing concepts of the present invention. In particular, the BTS-accurate insertion of data fields 31 by a downstream source nodes into frames 20 on channels 8 through a digital cross-connect requires the use of this method.

The referenced patent application [3] provides a simple, fast and efficient packet forwarding scheme used in a preferred implementation of a network system 1 utilizing the present invention for optimizing the network bandwidth utilization efficiency.

The referenced patent application [4] provides specifications for a practical network appliance that utilizes concepts of the present invention, plus a number of practical application examples.

The referenced patent application [6] provides amended comprehensive system engineering specifications for a preferred practical implementation of the present invention. Major amendments in [6] over [4] is the frame-BTS-accurately switchable VC-3-Xc based Adaptive Concatenation Multiplexer Bus (AMB), which increases the bus capacity re-allocation frequency to a rate of once per VC-3 frame period. Additionally, the use of SDH/SONET contiguous concatenation of the member VC-3s of the AMB 9 eliminated the need for the logic-implementation-wise costly differential delay compensation buffering function that would be needed in case of virtual concatenation, plus simplified the AMB Mapper and AMB Demapper instances, thereby streamlining the logic implementation of the present invention. A mapping of terms and acronyms used in the reference implementation specified in referenced provisional application [6] and the more generic ones used in this patent application is provided below:

| | |
|---|---|
| ABI | node 4 |
| AMB | bus 9 |
| BAT | Access Control Tag (ACT) bus capacity allocation tag 30 |
| BCR | bus capacity request, carried from a source node to destination node of AMB 9 using bits 41 |
| ITN | network system 1, packet transport network comprising buses 9 |
| IM | interface unit 4 of network system 1 |

CONCLUSIONS

This detailed description is a specification of a currently preferred embodiment of the present invention for application examples discussed in the foregoing. Specific architectural and logic implementation examples are provided in this and the referenced patent applications for the purpose illustrating a currently preferred practical implementation of the invented concept. Naturally, there are multiple alternative ways to implement or utilize, in whole or in part, the principles of the invention as set forth in the foregoing. Therefore, those skilled in the art will be able to develop different versions and various modifications of the described embodiments, which, although not necessarily each explicitly described herein individually, utilize the principles of the present invention, and are thus included within its spirit and scope. For instance, while this detailed description has used consistently VC-3 as the reference embodiment of the dynamic frame-switched channel, mapping the concept of the invented dynamic switching method for various other potential embodiments of a digital communications channel, including but not limited to SONET STS-1/3c/12c/48c/192c, VT-1.5/2/6 or SDH VC-11/12/2/3/4(-Xc) (X is an integer), or wavelengths in WDM system, will be obvious for those skilled in the art. It is thus intended that the specification and examples be considered as exemplary only, with a true scope of the invention being indicated by the following claims.

What is claimed is:

1. A multi-node communications network system for maximizing communications traffic throughput through dynamic optimization of network capacity allocation, the network system comprising:
   a plurality of channel source nodes;
   a destination node; and
   at least one dynamically switched communications channel configured to transport data from the channel source nodes to the destination node,
     wherein said channel has a framed signal comprising a continuous sequence of signal frames,
     wherein, for each new signal frame in the sequence of signal frames, the network system is configured to assign one of the channel source nodes to transmit data on the channel,
     wherein said signal frames identify which one of the set of channel source nodes is assigned to transmit data on the channel on a following signal frame,
     and wherein at least one of the set of channel source nodes is configured I) to monitor specified overhead bitfields, referred to as Access Control Tags (ACTs), in successive signal frames on the channel, and II) based at least in part on the monitoring, to determine whether to transmit data on the channel on any given one of its successive signal frames associated with any given ACT.

2. Network system of claim 1 wherein the following signal frame is the next full signal frame on which the identified source is able to transmit data on the channel.

3. The network system of claim 1 wherein two or more of the channels are time-slot-interleaved within a time-division-multiplexing (TDM) channelized bus, which has the common destination node of its channels as the bus destination node, and the source nodes of its channels as the bus source nodes.

4. The network system of claim 3 wherein said bus is carried within:
   a) a Synchronous Digital Hierarchy (SDH) Synchronous Transport Module level N (STM-N) carrier signal, where integer N denotes any valid SDH physical signal rate such as 0, 1, 4, 16, 64 or 256,
   b) or a corresponding Synchronous Optical Network (SONET) Synchronous Transport Signal level N (STS-N) carrier signal, where integer N denotes is any valid SONET physical signal rate such as 1, 3, 12, 48, 192 or 768,
   both of which are hereafter referred to as SDH STM-N signals.

5. The network system of claim 4 wherein the channels of the bus are Virtual Container level n (VC-n) timeslots (TSs) within its STM-N carrier signal, or STS-1 TSs within its STS-N carrier signal, both of which are hereafter referred to as VC-n TSs, and wherein the signal frames on the channels have a frame structure of VC-n frames, where n denotes any valid SDH container size such as 11,12,2,3 or 4.

6. The network system of claim 5 wherein the VC-n TSs of the bus are member VC-n:s of a single VC-n-Xc concatenation group, referred to hereafter as a VC-n-Xc bus, aligned via concatenated Administrative Unit level n (AU-n-Xc) on the STM-N carrier of the bus, where the concatenation coefficient X denotes a number of VC-n TSs on the VC-n-Xc bus.

7. The network system of claim 6 wherein specified path overhead (POH) bits, referred to as Access Control Tag (ACT), in each VC-n frame period on at least one VC-n TS of the VC-n-Xc bus are used to identify which one of the source nodes of the VC-n TS channel is to transmit data on a following Container level n (C-n) frame on said VC-n TS of the bus.

8. The network system of claim 7 wherein the following C-n frame is the next full C-n frame on the VC-n channel on which the identified source node is able transmit data.

9. The network system of claim 8 wherein a set of VC-n TSs assigned to an individual source node of the bus for a given VC-n frame period on the VC-n-Xc bus are concatenated to form a single, logically un-channelized, connection from said source node to the destination node of the bus.

10. The network system of claim 9 wherein the destination node of the VC-n-Xc bus provides, per at least one of the source node of the bus, a logic instance referred to as a demapper that is capable of recovering data packets from its associated source node specific connection on the bus, and wherein in each such demapper instance identifies, based at least in part on an information received at the destination node within the VC-n frames of the VC-n-Xc bus, which VC-n TSs on the VC-n-Xc bus form its associated source node specific connection on any given VC-n frame period on the VC-n-Xc bus.

11. The network system of claim 10 wherein the information received at the destination node within the VC-n frames of the VC-n-Xc bus that is used to identify which VC-n IS belongs to which source node specific connection on a given VC-n frame period includes at least in part the ACT carried within at least one VC-n of the bus.

12. A control process for dynamically sharing a digital communications channel bandwidth among multiple source nodes, said channel being able to transport data from multiple source nodes to a channel destination node and having a carrier signal consisting of a continuous sequence of signal frames, said process comprising:

dynamically allocating the channel bandwidth among its multiple source nodes, by assigning channel signal frame transmission slots among the source nodes, through activating, via signal frame overhead information fields, individual source nodes of the channel to transmit data on the channel on future signal frames associated with said signal frame overhead information fields, and transmitting data on the channel by its individual source nodes on exactly those signal frames that were assigned to each individual source node via signal frame overhead information fields associated with said signal frames, wherein the process element of transmitting involves a sub-process performed by at least one of the set of channel source nodes that includes the below steps:

I) monitoring specified overhead bitfields, referred to as Access Control Tags (ACTs), in each signal frame on the channel, and II) based at least in part on the step I), either transmitting or not transmitting data on the channel on the signal frame associated with a given ACT.

13. The process of claim 12 wherein the step I) includes the below sub-steps:

a) locating and capturing the ACT carried within the channel signal frames, and b) processing the ACT found in each frame to determine whether the channel signal frame associated with said ACT is assigned to the source node processing the ACT.

14. The process of claim 13 wherein the step a) includes the below sub-steps:

i) based on a specified signal frame boundary detection pattern and other associated overhead information found in the channel carrier signal, maintaining a frame timeslot counter that keeps track of the current timeslot on the signal frame on the channel as accessible by the node in question, and ii) capturing the ACT of a signal frame at specified frame timeslot or timeslots specified for carrying ACT.

15. The process of claim 13 wherein the step b) includes the below sub-steps:

i) determining whether there is a match between an active source node identification code found within the ACT and a related local node identification code of the node in question, and ii) in case in step i) there is a match, determining that the local node shall transmit data on the channel signal frame associated with said ACT, and otherwise determining that the local node shall not transmit data on that channel signal frame.

16. The process of claim 12 wherein the carrier signal is:

a) a Synchronous Digital Hierarchy (SDH) Virtual Container level n (VC-n-Xc) aligned via Administrative Unit level n (AU-n-Xc) into a STM-N signal, where n=11,12, 2,3 or 4, concatenation level X is any positive integer including 1, in which case AU/VC-n-Xc reduce to AU/VC-n, and N denotes valid SDH physical layer signal rate such as 0, 1, 4, 16, 64 or 256, or b) a SONET signal corresponding to one of the above SDH signals, e.g., STS-1-Xc where X is any positive integer, both of which are referred to as VC-n-Xc or VC-n, whichever applicable in each individual context, and wherein the channel is a VC-n timeslot within its VC-n-Xc carrier signal, which comprises X VC-n timeslots.

17. The process of claim 16 wherein the channel source node, when it transmits data on the channel, does so using the VC-n frame phase derived from its received channel SDH/SONET signal, so that during normal channel operation the destination node of the channel continuously receives a regular SDH VC-n-Xc carrier signal with continuous AU-n-Xc pointer with no other offset changes than those associated with SDH standard pointer offset increment or decrement operations, regardless of which one of the channel source nodes transmits data on which one of the VC-n frames on the channel.

18. The process of claim 16 wherein the ACT is carried in VC-n path overhead timeslots of channel signal frames.

19. The process of claim 16 wherein the ACT carried in each VC-n frame period on the channel determines which one of the set of channel source nodes is to transmit data on the next VC-n frame period on the channel.

20. The process of claim 19 wherein the ACT carried in each VC-n frame row determines which one of the set of channel source nodes is to transmit data on a subsequent VC-n row on the channel.

21. The process of claim 20 wherein the subsequent VC-n row is the next full VC-n row on which the node is able to transmit data on the channel.

* * * * *

UNITED STATES PATENT AND TRADEMARK OFFICE
CERTIFICATE OF CORRECTION

PATENT NO. : 7,558,260 B2
APPLICATION NO. : 10/382729
DATED : July 7, 2009
INVENTOR(S) : Mark Henrik Sandstrom It is certified that error appears in the above-identified patent and that said Letters Patent is hereby corrected as shown below:

In claim 11, on column 14, line 60, please change "VC-n IS" to "VC-n TS."

Signed and Sealed this

Twenty-second Day of September, 2009

David J. Kappos
*Director of the United States Patent and Trademark Office*